United States Patent [19]

Boudreault

[11] 4,415,104

[45] Nov. 15, 1983

[54] MATERIAL SPREADING IMPLEMENT

[76] Inventor: Laurent Boudreault, 187 rang Caron, La a la Croix, Lac St-Jean, P.Q., Canada, G0W 1W0

[21] Appl. No.: 260,676

[22] Filed: May 5, 1981

[51] Int. Cl.³ .............................................. A01C 3/06
[52] U.S. Cl. .................................. 222/610; 222/626; 222/386
[58] Field of Search ............... 222/610, 626, 392, 393, 222/386; 239/657, 663, 672, 680; 414/514, 515, 519

[56] References Cited

U.S. PATENT DOCUMENTS

| | | |
|---|---|---|
| 611,184 | 9/1898 | Rainey . |
| 982,330 | 1/1911 | Whitely . |
| 2,332,903 | 10/1943 | Downey . |
| 2,495,358 | 1/1950 | Wengert ............................. 414/515 |
| 2,676,002 | 4/1954 | Wolfe . |
| 3,014,729 | 12/1961 | Hinningsen et al. . |
| 3,044,661 | 7/1962 | Cartwright ......................... 222/626 |
| 3,072,290 | 1/1963 | De Biasi ............................. 222/610 |
| 3,123,363 | 3/1964 | Bedtke . |
| 3,175,830 | 3/1965 | Lepp . |
| 3,185,326 | 5/1965 | Vanderloop . |
| 3,228,701 | 1/1966 | Smith et al. . |
| 3,847,356 | 11/1974 | Blanshine . |
| 4,002,272 | 1/1977 | Crawford . |
| 4,067,501 | 1/1978 | Tate . |
| 4,169,559 | 10/1979 | McKee . |
| 4,220,280 | 9/1980 | Trott et al. . |

Primary Examiner—Joseph J. Rolla
Assistant Examiner—Thomas C. Fitzgerald
Attorney, Agent, or Firm—Steele, Gould & Fried

[57] ABSTRACT

The implement includes a hydraulically operated beater assembly mounted at the rear end of a box-like structure, and is modified so that the beater assembly may be detached from the rear end of the structure so that the latter may be used for other chores. The hydraulic components for operating the beater assembly are mounted to a side frame thereof and are connected, through detachable conduit circuits, to similar hydraulic circuits mounted on the box structure. A push-off gate that travels longitudinally inside the box structure to push material from the latter to the beater is received on the beater assembly when the latter is removed.

7 Claims, 8 Drawing Figures

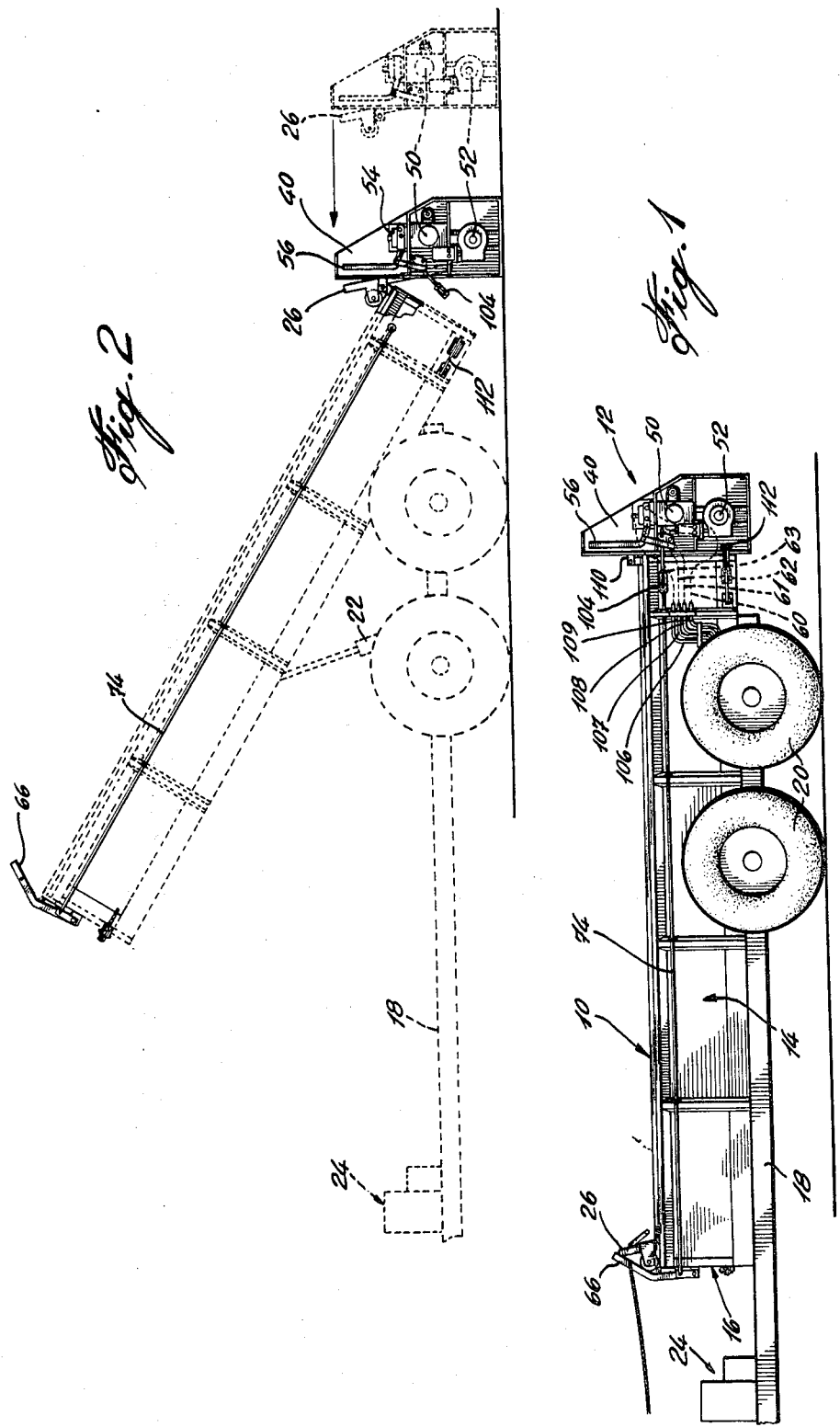

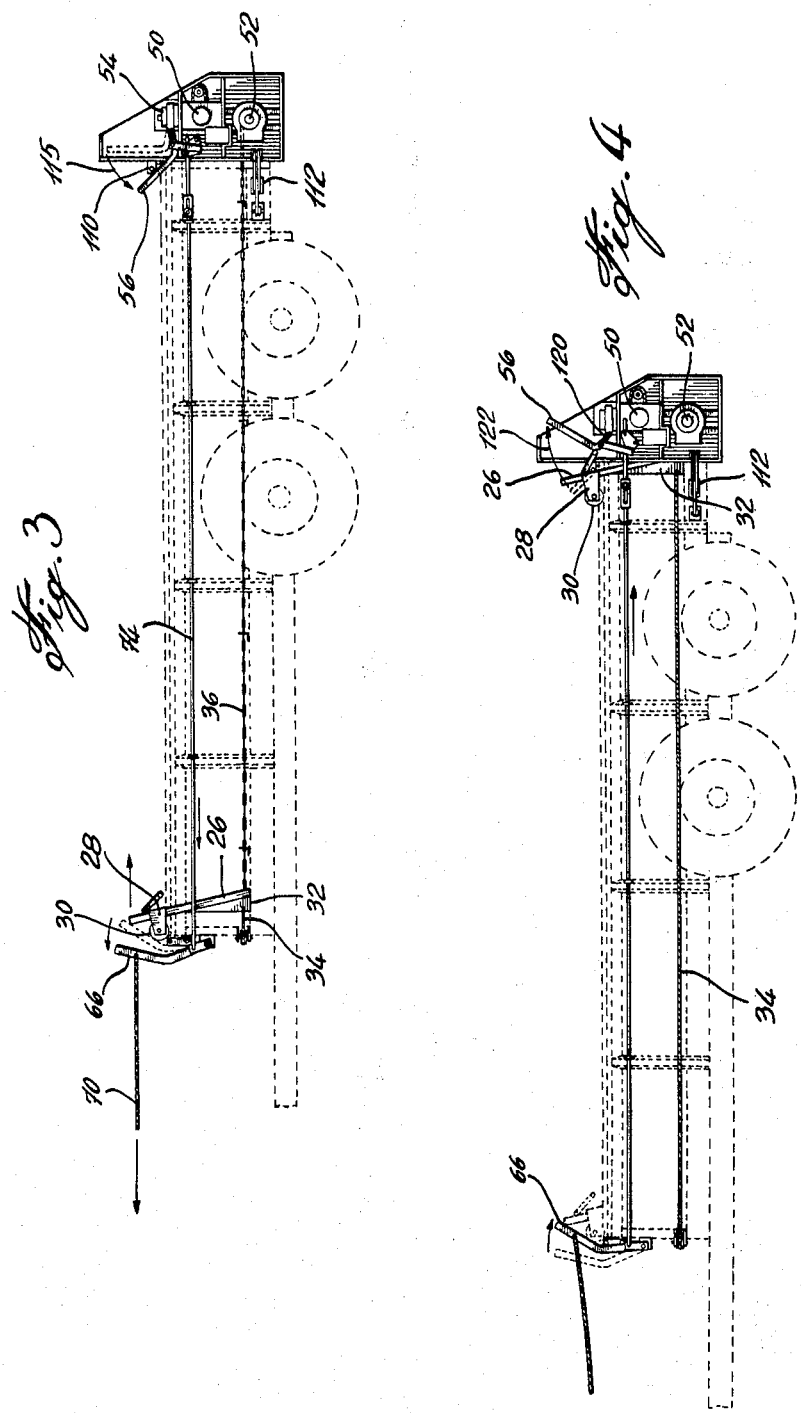

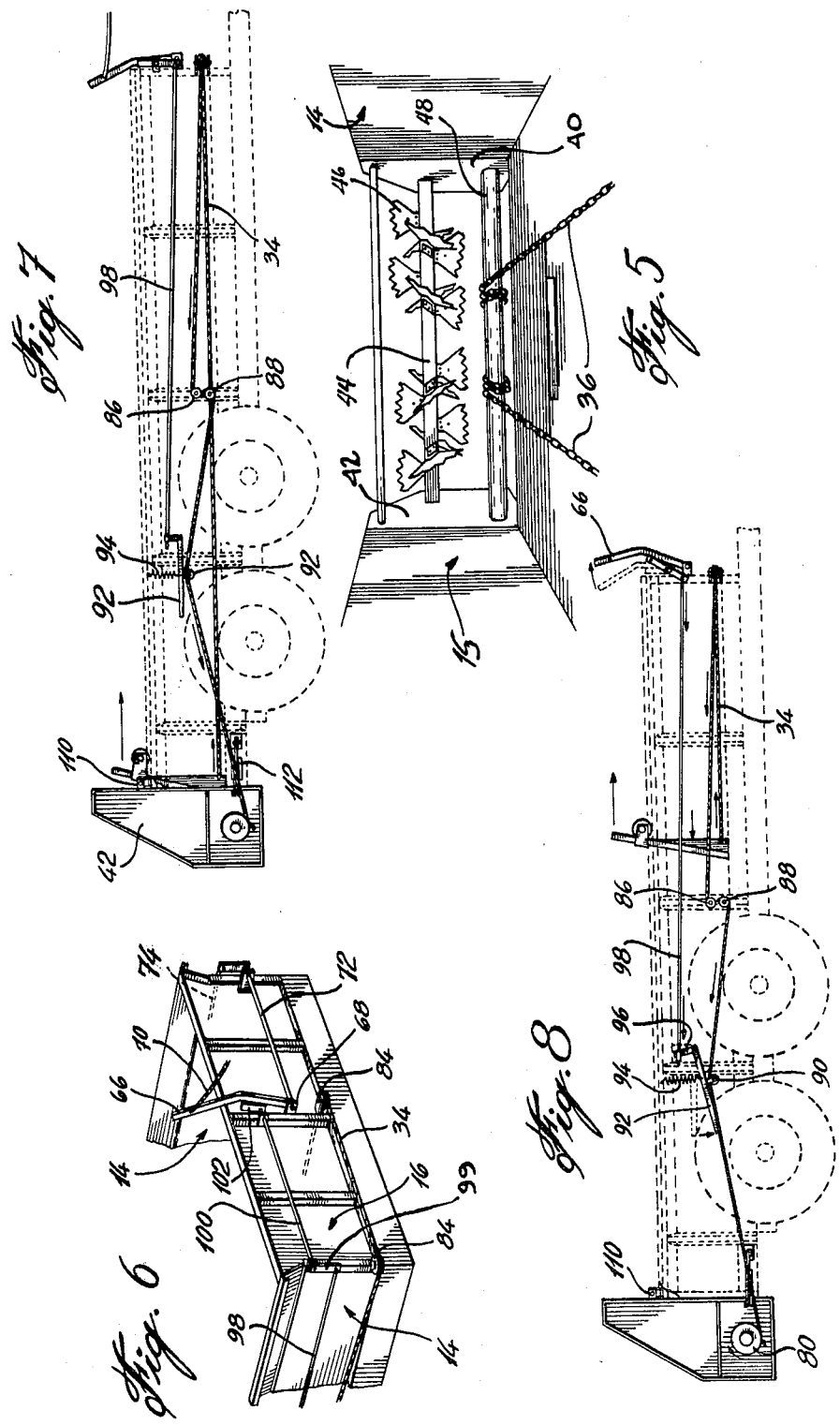

MATERIAL SPREADING IMPLEMENT

FIELD OF THE INVENTION

The present invention is directed to a material spreading implement which includes a box-like structure and a hydraulically operated material beater assembly wherein the latter may be detached from the box structure so that it may then be used for other chores.

BACKGROUND OF THE INVENTION

Various types of manure spreaders are known; basically, they consist of a box structure into which material to be spread is placed, a push-off gate within the box structure for moving the material towards the rear of the box structure where an unloading and spreading mechanism discharges the pushed material. Some spreaders have their unloading and beating mechanism entirely hydraulically operated so that all parts operate automatically in synchronism; such a spreader may be found described, for example, in Canadian Pat. No. 1,048,567 issued Feb. 13, 1979 to Harder. However, the spreader described in this patent, although capable of being converted into a dump box for hauling material, has its beater mechanism permanently affixed to the box structure. The rear end of such spreader is therefore hindered, and consequently limited in use, by the presence of the beaters permanently mounted at the rear of the box structure.

OBJECTS AND STATEMENT OF THE INVENTION

It is an object of this invention to provide a material spreading implement wherein the beater assembly located at the rear of the box structure can be detached from the box structure so that the latter can be used to perform various other functions which require open box structures, especially in farming.

It is a further object of this invention to provide such implement with a beater assembly which is entirely hydraulically operated.

The present invention therefore comprises, in combination, a box structure opened at the rear end thereof and a hydraulically operated beater assembly which is detachably mounted at the rear end so that the box structure, once freed from the beater assembly, may be used for other chores; the beater assembly includes:

(a) a pair of upwardly extending spaced side frames;

(b) a rotary material beater mounted to the side frames and extending therebetween;

(c) a first hydraulic motor mounted to one of the side frames for operating the beater;

(d) a rotatable chain-wrapping member extending between the side frames below the beater;

(e) a second hydraulic motor mounted to one of the side frames for rotating the member;

(f) valve means mounted to one of the side frames and connected to the second hydraulic motor; and (g) hydraulic conduit means connected to the valve and motor means; the box structure is defined by a front wall and opposite sidewalls and includes therein a push-off transverse gate movable from front to rear between the sidewalls of the box structure to push material into the rotary beater; chain means connect the gate to the chain-wrapping member of the beater assembly and are wrapped around the member as the gate is moved to the rear end of the box structure; hydraulic conduit means mounted on the box structure are detachably connectable to the hydraulic conduit means of the beater assembly; means detachably connectable to the valve means for actuating the valve means are mounted to one of the side walls of the box structure; securing means for fixedly mounting the beater assembly to the rear end of the structure are releasable to allow the beater assembly to be detached from the rear end of the structure with the push-off gate mounted to the beater assembly and the chain means wrapped on the chainwrapping member.

Those components of the beater assembly which are supported by the box structure, when in assembly with the beater assembly, are part of the detachable beater mechanism when detached from the box structure. On the other hand, those components which are located on the side frames of the box structure remain there when the beater mechanism is detached from the box structure; with this arrangement, they do not hinder the use of the implement for other chores and, furthermore, they may be used for connection with other hydraulically operated mechanisms needed in framing, such as cereal discharging and conveying, foddder, etc.

Other objects and advantages of the present invention will become apparent from the following detailed description of one embodiment of the invention; it should be understood, however, that various modifications can be brought to this embodiment without departing from the scope of the appended claims.

BRIEF DESCRIPTION OF THE DRAWINGS

FIG. 1 is a side elevational view of the combination of an implement made in accordance with the present invention;

FIG. 2 is a schematic elevational view showing the operation of detaching the beater assembly from the trailer;

FIGS. 3 and 4 are schematic illustrations showing one side of the implement with the push-off gate in the frontmost position and in the rearmost position, respectively;

FIG. 5 is a view of the beater device as seen from the trailer;

FIG. 6 is a front perspective view of the front portion of the trailer;

FIGS. 7 and 8 are schematic illustrations showing the other side of the implement on which is mounted a tensioning device for the cable joining the push-off gate to the beater mechanism.

DESCRIPTION OF A PREFERRED EMBODIMENT

Referring to FIGS. 1, there is shown a manure spreader implement consisting of a box structure or trailer 10 and of a beater assembly 12. The box structure 10 is defined by a pair of longitudinal side walls 14, 15 and a front wall 16; the structure is mounted on a frame 18 supported on a tandem wheel arrangement 20.

The box structure is tiltably mounted on frame 18, as shown in FIG. 2, by means of an hydraulic cylinder arrangement 22. Hydraulic conduit means (not shown) extend in frame 18 between the hydraulic cylinder 22 and an hydraulic supply and controlling system 24 mounted at the front end of frame 18.

Referring, more particularly, to FIG. 3, a push-off transverse gate 26 is mounted inside the box structure 10 between both side wals 14, 15; the opposite ends of the upper part of the gate are provided with brackets 28 and rollers 30 which are adapted to roll along the upper edges of the side walls 14, 15 of the box structure.

To the lower part of the rear wall of push-gate 26 a triangular shaped plate 32 allows the gate to lie slightly rearwardly inclined; a cable 34 is connected to plate 32 while the lower front part of the gate is connected to a pair of chains 36. The opposite ends of cable 34 and chains 36 will be described hereinbelow.

The beater assembly 12 comprises a pair of upwardly extending side frames 40, 42 with a first rotatable shaft 44 (see FIG. 5) extending therebetween for carrying paddles 46 which beat the material which is to be discharged from the box structure. A second rotatable shaft 48 in the form of a tubular member extends in the lower portion of the beater assembly between side frames 40,42. The extremities of chains 36 are connected to shaft 48 so that they may be wrapped therearound as the push-gate is moved towards the rear. The rotation of shaft 44 is accomplished by a first hydraulic motor 50 mounted to and outside side frame 40. The rotation of the lower tubular member is effected by means of a second hydraulic motor 52 which is also mounted to the side frame 40 below the hydraulic motor 50. The operation of the hydraulic motors 50,52 is controlled by means of a valve 54 which is actuatable in response to various positions of an arm 56 connected thereto.

A series of hydraulic conduit means are connected to the motors 50,52 and valve 54 for their operation as shown by dotted lines 60,61,62,63 seen in FIG. 1.

The actuation of arm 56 is carried out either by its being contacted by the upper part of the gate 26 as described below or by the actuation of lever 66.

Referring to FIG. 6, lever 66 is pivotally mounted to the front wall 16 by means of a bracket 68. The pivotal movement of arm 66 either through a manual pulling by the implement operator on a cable 17 entails the rotation of a rod 72 extending over the front wall 16 and the pulling of a second rod 74 extending along the side wall 14. Lever 66 is bent so that it may extend over the upper edge of the front wall 16 and be contacted by the push-gate as it returns to its frontmost position in the box structure.

Referring to FIGS. 6, 7 and 8, cable 34 which has one end connected to the lower part of the push-gate has its remote end connected to a drum 80 which is mounted at one extremity of shaft 48 outside side frame 42. Cable 34 extends through a hole (not shown) in front wall 16, then proceeds transversely thereacross over a pair of pulleys 82,84 mounted to the front wall; the cable then extends along side wall 15 and passes over an arrangement of pulleys 86,88,90 to the drum 80. Pulleys 86, 87 are fixedly mounted to the side frame while pulley 90 is integral with a pivotable arm 92 resiliently connected to the side frame by means of a spring 94. The arm 92 has a vertical portion 96 connected to a rod 98 which, in turn, is connected, through a pivot plate 99, to a further rod 100 extending along the front wall of the box structure. When actuated, rod 100 pivots a small plate 102 which causes lever 66 to move in a direction away from the front wall.

Referring to FIGS. 1 and 2, rod 74 is connected to lever 56 by means of a detachable connection 104. A series of hydraulic conduit means 106, 107, 108, 109 are mounted to the side wall 14 and extend in frame 18 to the hydraulic supply system 24 located at the front of the frame. The beater assembly 12 includes, on each side frame 40,42, a hook 110 which engages a corresponding part on the upper edge of the side walls 14,15. To the lower rear part of each side wall 14,15, a releasable locking arrangement 112 is provided to firmly hold the beater assembly 12 against the rear end of the box structure.

The operation to detach the beater assembly 12 from the box structure 10 (as shown in dotted lines in FIG. 2) will now be described. Cable 34 is detached from the rear plate 32 of the gate. Motor 52 is actuated to rotate shaft 48 whereby the chains 36 pull on gate 26 as they wrapped on the shaft. Motor 52 is then actuated in reverse so that the freed cable 34 may wrap on drum 80. The hydraulic conduits 60, 61, 62, 63 of the beater assembly are disconnected from their corresponding hydraulic conduits 106, 107, 108, 109 of the box structure. The rod connection 104 is also disconnected while the locking arrangement 112 is disengaged so that the lower rear part of the assembly is freed from the adjacent rear edges of the side walls of the box structure as soon as the latter is tilted by cylinder 22. In the position shown in FIG. 2, the hooks 110 are disconnected. The trailer may then be used for other chores since the space within the box structure is entirely free of any components needed when the implement is used as a manure spreader. However, the hydraulic conduits 106, 107, 108, 109 remain attached to the box so that they may be used for connection with other hydraulically operated mechanisms especially used in farming such as cereal discharging and conveying systems.

Referring to FIGS. 3 and 4, the operation of arm 56 will now be described. The operator pulls cable 70 causing lever 66 to pivot frontwardly and, through rod 74, pivoting arm 56 as indicated by arrow 115. This sets the push-gate 26 in operation moving the gate towards the rear of the box structure which beats and spreads the material being discharged. The pivotal movement of arm 56 causes valve 54 to set the hydraulic motors 50, 52 in operation. As explained above, the rotation of motor 52 causes chains 36 to wrap around the tubular member 48 while motor 50 rotates the beating paddles 46. Once the push-gate reaches the position shown in FIG. 4, the push-gate contacts arm 56 which, under the pulling action of spring 120, moves arm 56 in the direction shown by arrow 122 to a rearmost position, such shown in FIG. 4. Simultaneously, rod 74 causes lever 66 to take the position also shown in FIG. 4.

Arm 56 is in a neutral position such as shown in FIGS. 1 and 2, when the hydraulic motors do not operate. This neutral position may be obtained manually or by the tensioning system shown in FIGS. 7 and 8. If the push-gate 26 is accidentally blocked as a result of material jamming its displacement in the box structure, the continuous rotation of drum 80 will cause the cable 34 to pull down arm 92 which will pivot moving rearwardly rod 98 and moving lever 66 to an intermediate position corresponding to a neutral position of arm 56.

It should be understood that, although one specific form of the invention, has been described, the invention may be refined and modified in various ways. It is therefore wished to have it understood that the present invention should not be limited in interpretation except by the scope of the following claims.

What is claimed is:
1. A material spreading implement, comprising:
a box-like structure defined by a front wall and opposite side walls, being opened at the rear end thereof;
a hydraulically operated beater assembly detachably mountable at said rear end so that said box-like structure may be freed of said beater assembly and used for other chores, said beater assembly including:
(a) a pair of upwardly extending spaced side frames;
(b) a rotary material beater mounted to said side frames and extending therebetween;
(c) a first hydraulic motor mounted to one of said side frames for operating said beater;
(d) a rotatable chain-wrapping member extending between said side frames below said beater;
(e) a second hydraulic motor mounted to one of said side frames for rotating said member;
(f) valve means mounted to one of said side frames and connected to said second hydraulic motor, said valve means including lever means disposed on said one side frame to be contacted by said gate, said lever means, when contacted, causing actuation of said second hydraulic motor and rotation of said chain-wrapping member in opposite direction to return said gate to the front wall of said box-like structure; and,
(g) hydraulic conduit means connected to said valve and motor means;
a push-off transverse gate movable from front to rear between said side walls in said box-like structure to push material into said rotary beater;
chain means connecting said gate to said chain-wrapping member of said beater assembly whereby said chain means are wrapped around said member as said gate moves to said rear end of said box-like structure;
hydraulic conduit means mounted on said box-like structure detachably connectable to the hydraulic conduit means of said beater assembly;
means detachably connectable to said valve means for actuating said valve means, said actuating means being mounted to one of said side walls of said box-like structure; and,
securing means for fixedly mounting said beater assembly to said rear end of said structure, said securing means being releasable to allow said beater assembly to be detached from said rear end of said structure with said push-off gate mounted to said beater assembly and said chain means wrapped on said chain-wrapping member.

2. An implement as defined in claim 1, further comprising hydraulic lift means for tilting said box-like structure to assist in detaching said beater assembly from said rear end of said structure.

3. An implement as defined in claim 1, further comprising second lever means mounted on said front wall of said box-like structure and so disposed as to be contacted by said gate when said gate has reached said front wall, said second lever means being connected to the lever means of said valve means through said actuating means to stop rotation of said first and second hydraulic motors.

4. An implement as defined in claim 1, wherein said box-like structure is mounted on a frame and further comprising; hydraulic supply means connected to the hydraulic conduit means of said implement and mounted on said frame at the front end thereof.

5. A material spreading implement, comprising:
a box-like structure defined by a front wall and opposite side walls, being opened at the rear end thereof;
a hydraulically operated beater assembly detachably mountable at said rear end so that said box-like structure may be freed of said beater assembly and used for other chores, said beater assembly including:
(a) a pair of upwardly extending spaced side frames;
(b) a rotary material beater mounted to said side frames extending therebetween;
(c) a first hydraulic motor mounted to one of said side frames for operating said beater;
(d) a rotatable chain-wrapping member extending between said side frames below said beater;
(e) a second hydraulic motor mounted to one of said side frames for rotating said member;
(f) valve means mounted to one of said side frames and connected to said second hydraulic motor; and,
(g) hydraulic conduit means connected to said valve and motor means;
a push-off transverse gate movable from front to rear between said side walls in said box-like structure to push material into said rotary beater;
chain means connecting said gate to said chain-wrapping member of said beater assembly whereby said chain means are wrapped around said member as said gate moves to said rear end of said box-like structure;
hydraulic conduit means mounted on said box-like structure detachably connectable to the hydraulic conduit means of said beater assembly;
means detachably connectable to said valve means for actuating said valve means, said actuating means being mounted to one of said side walls of said box-like structure;
securing means for fixedly mounting said beater assembly to said rear end of said structure, said securing means being releasable to allow said beater assembly to be detached from said rear end of said structure with said push-off gate mounted to said beater assembly and said chain means wrapped on said chain-wrapping member;
drum means mounted on the opposite side frame of said beater assembly and associated with said chain-wrapping member; and,
a cable having one end connected to said drum means and the other end connected to the lower part of said gate whereby rotation of said drum means by said second hydraulic motor in the opposite direction causes said cable to wrap on said drum means to cause the return of said gate to the front wall as said chain means unwrap from said member.

6. An implement as defined in claim 5, further comprising means mounted on said box-like structure along one side wall thereof for tensioning said cable between said drum means and said gate.

7. An implement as defined in claim 6, further comprising means associated with said tensioning means for actuating said second lever means when said tensioning means exceed a predetermined tension value.

* * * * *